(12) United States Patent
Volanthen et al.

(10) Patent No.: US 8,336,389 B2
(45) Date of Patent: Dec. 25, 2012

(54) OPTICAL FIBRE SENSOR ARRAY WITH TEMPERATURE COMPENSATION

(75) Inventors: Mark Volanthen, Romsey (GB); Robert Allan Angus, Southampton (GB)

(73) Assignee: Moog Insensys Limited, Fareham, Hampshire (GB)

( * ) Notice: Subject to any disclaimer, the term of this patent is extended or adjusted under 35 U.S.C. 154(b) by 199 days.

(21) Appl. No.: 12/741,043

(22) PCT Filed: Nov. 3, 2008

(86) PCT No.: PCT/GB2008/051026
§ 371 (c)(1),
(2), (4) Date: Aug. 16, 2010

(87) PCT Pub. No.: WO2009/056892
PCT Pub. Date: May 7, 2009

(65) Prior Publication Data
US 2010/0307257 A1   Dec. 9, 2010

(30) Foreign Application Priority Data

Nov. 2, 2007   (GB) .................................. 0721617.9

(51) Int. Cl.
*G01L 1/24* (2006.01)
(52) U.S. Cl. .......................................... 73/800; 73/760
(58) Field of Classification Search .................... 73/760, 73/800
See application file for complete search history.

(56) References Cited

U.S. PATENT DOCUMENTS

| | | | |
|---|---|---|---|
| 5,649,035 A | 7/1997 | Zimmerman et al. | |
| 6,480,645 B1 * | 11/2002 | Peale et al. | 385/18 |
| 6,577,793 B2 * | 6/2003 | Vaganov | 385/52 |
| 6,635,470 B1 * | 10/2003 | Vann | 506/16 |
| 7,138,621 B2 * | 11/2006 | Wang | 250/227.14 |

(Continued)

FOREIGN PATENT DOCUMENTS
EP    1 148 324 A2    10/2001
(Continued)

OTHER PUBLICATIONS

United Kingdom Search Report from corresponding Application No. GB 0721617.9 dated Feb. 6, 2008.

(Continued)

*Primary Examiner* — Max Noori
(74) *Attorney, Agent, or Firm* — Renner, Otto, Boisselle & Sklar, LLP

(57) ABSTRACT

An optical fiber strain sensor array comprises several sensor support panels spaced in its longitudinal direction and at least one connecting member extending in the longitudinal direction, which mechanically interconnects the sensor support panels. An optical fiber is supported by the sensor support panels and the connecting member. The optical fiber extends with the connecting member between the sensor support panels and forms a curve on the sensor support panel, the curve including at least one portion of the optical fiber that extends in the transverse direction. The width of the connecting member is substantially less than the width of the sensor support panels, such that the connecting member is capable of flexure in the transverse direction. This has the advantage that the connecting member can be flexed to take up any slack during installation of the optical fiber strain sensor array in a wind turbine blade and can be fitted to the turbine blade even if the blade has a conical shape.

7 Claims, 4 Drawing Sheets

U.S. PATENT DOCUMENTS

| | | | |
|---|---|---|---|
| 7,482,924 B1 * | 1/2009 | Beinhocker | 340/555 |
| 2002/0028034 A1 | 3/2002 | Chen et al. | |
| 2006/0072869 A1 | 4/2006 | Arias Vidal et al. | |
| 2007/0284112 A1 | 12/2007 | Magne et al. | |

FOREIGN PATENT DOCUMENTS

| | | |
|---|---|---|
| WO | 03/076887 A1 | 9/2003 |
| WO | 2005/064300 A1 | 7/2005 |
| WO | 2005/071382 | 8/2005 |
| WO | 2006/094352 | 9/2006 |
| WO | 2006/107278 A1 | 10/2006 |

OTHER PUBLICATIONS

International Search Report for corresponding application No. PCT/GB2008/051026 dated Feb. 9, 2009.

* cited by examiner

OPTICAL FIBRE SENSOR ARRAY WITH TEMPERATURE COMPENSATION

This application is a national phase of International Application No. PCT/GB2008/051026 filed Nov. 3, 2008 and published in the English language.

FIELD OF THE INVENTION

This invention relates to a sensor array for structural monitoring, in particular the structural monitoring of wind turbine blades and, in particular, to the structural monitoring of wind turbine blades using fibre optic strain sensors.

BACKGROUND TO THE INVENTION

Blades for wind turbines are typically constructed of glass-reinforced plastics (GRP) on a sub-structure, which may be formed of wood, glass fibre, carbon fibre, foam or other materials. Graphite fibre in epoxy resin is also used. The plastics resin can be injected into a mould containing the sub-structure to form the outer surface of the blade. The blade may also be built up as a series of layers of fibre material and resin. In some cases, the fibre material is pre-impregnated with resin.

A typical wind turbine blade may have a length of between 20 and 60 meters or more. As the interior of the blade is generally hollow, a "floor" is provided within the blade proximate the hub-engaging end of the blade. The blade floor is a bulkhead about 0.5 meters to 2.5 meters into the blade that prevents service personnel falling into a blade while working in the hub.

It is known, for example from U.S. Pat. No. 4,297,076, to provides the blades of a wind turbine with strain gauges and to adjust the pitch of portions of the blades in response to the bending moment on the blades measured by the strain gauges. Optical fibre strain sensors are known and WO 2004/056017 discloses a method of interrogating multiple fibre Bragg grating strain sensors along a single fibre. In the system of WO 2004/056017, Bragg gratings are defined in the optical fibre at spaced locations along the optical fibre. When the optical fibre is put under strain, the relative spacing of the planes of each Bragg grating changes and thus the resonant optical wavelength of the grating changes. By determining the resonant wavelength of each grating, a strain measurement can be derived for the location of each grating along the fibre. Optical strain sensors operating on the principle of back scattering which do not require discrete gratings along the fibre are also known.

On the one hand, optical fibres are delicate components that require very accurate alignment to function correctly and can easily be damaged during installation and maintenance. Wind turbine blades, on the other hand, are very large structures built for structural stability in potentially harsh environments. The present invention, at least in its preferred embodiments seeks to assist in the correct alignment of optical fibres on the structure of a wind turbine blade.

SUMMARY OF THE INVENTION

According to the present invention, there is provided an optical fibre strain sensor array having a longitudinal direction and a transverse direction. The array comprises a plurality of sensor support panels spaced in the longitudinal direction and having a width in the transverse direction. The array further comprises at least one connecting member extending in the longitudinal direction and having a width in the transverse direction, the connecting member(s) mechanically interconnecting the sensor support panels, and an optical fibre supported by the sensor support panels and the connecting member. The optical fibre extends with the connecting member between the sensor support panels and forms a curve on the sensor support panel. The curve includes at least one portion of the optical fibre that extends in the transverse direction. The width of the connecting member is substantially less than the width of the sensor support panels, whereby the connecting member is capable of flexure in the transverse direction.

This arrangement has the advantage that the connecting member can be flexed to take up any slack during installation of the optical fibre strain sensor array in a wind turbine blade, for example. Thus, the connecting members of the sensor array can be made intentionally longer than the distance between the installed sensor support panels, so that the flexing of the connecting members accommodates manufacturing tolerances of the turbine blade. Furthermore, the sensor array according to the invention can be fitted to the turbine blade even if the blade has a conical shape, because the flexure of the connecting members accommodates any distortion due to the conical, rather than cylindrical, shape of the blade.

In embodiments of the invention, the portion of the optical fibre that extends in the transverse direction includes an optical fibre strain sensor. In this way, strain sensor array can be formed into a loop to fit inside a wind turbine blade of substantially circular cross-section (so that the longitudinal direction of the sensor array is the circumferential direction of the turbine blade surface) with the optical fibre strain sensors substantially parallel with the length of the turbine blade. The optical fibre strain sensor may be a Bragg grating or other suitable strain sensor.

In embodiments of the invention, the width of the sensor support panel is greater than 5 times, preferably greater than 10 times, more preferably greater than 25 times and possibly greater than 40 times the width of the connecting member. In determining this ratio, the average width of the sensor support panel or connecting member calculated along its entire extent in the longitudinal direction should be used. The significantly greater width of the sensor support panels provides sufficient space for the optical fibre to form the curve without kinking and also provides room for variation in the transverse extent of the curve. Varying the transverse extent of the curve when the optical fibre is applied to the sensor support panel allows any slack in the optical fibre between support panels to be taken up by extending the curve.

The length of the connecting members may be greater than 10 times, preferably greater than 50 times, more preferably greater than 250 times and possibly greater than 400 times the width of the connecting member. In determining this ratio, the average width of the connecting member calculated along its entire extent in the longitudinal direction should be used. A large length compared to its width generally imparts high flexibility to the connecting member.

The sensor support panel may be thinner in the direction normal to both the transverse and longitudinal directions than the connecting member. Making the sensor support panel thin assists in locating the optical fibre as close as possible to a surface to which the sensor support panel is attached, such as the surface of a turbine blade. Similarly, a thicker connecting member can have sufficient structural stability even though its width is much less than that of the sensor support panels.

The sensor array may comprise a temperature compensation device. Typically, the temperature compensation device comprises a strain sensor that is decoupled mechanically from the sensor array, whereby expansion of the strain sensor is due only to thermal expansion. The temperature compensation device may be located at any suitable location on the sensor array. For example, the temperature compensation device may be located on a sensor support panel or on the connecting member. In a preferred embodiment, at least one sensor support panel comprises a temperature compensation device.

The temperature compensation device may take the form of a housing surrounding the optical fibre and fixed to the optical fibre at each end of the housing, wherein the length of the optical fibre within the housing is greater than the distance between the ends of the housing. The housing may be formed from a base and a cover, whereby the optical fibre can be located within the housing during manufacture by placing the optical fibre on the base and attaching the cover. This configuration allows for simple location of the optical fibre within the temperature compensation device. In general, the portion of the optical fibre within the housing may comprise an optical fibre strain sensor.

The sensor support panel(s) and/or the connecting member may be formed of layers of fibre glass or carbon fibre with the optical fibre sandwiched between the layers. Forming the sensor array from fibre glass is advantageous in that wind turbine blades are typically constructed of fibre glass or carbon fibre such that, the material of the sensor array is compatible with the blade material.

BRIEF DESCRIPTION OF THE DRAWINGS

Embodiments of the invention will now be described by way of example only and with reference to the accompanying drawings, in which:

FIG. 4a illustrates the detail of the connection between the connecting member of FIG. 1 and the sensor support panel;

FIG. 4b is a cross-sectional view along line A-A of FIG. 4a;

DETAILED DESCRIPTION OF EMBODIMENTS

Figure 1:
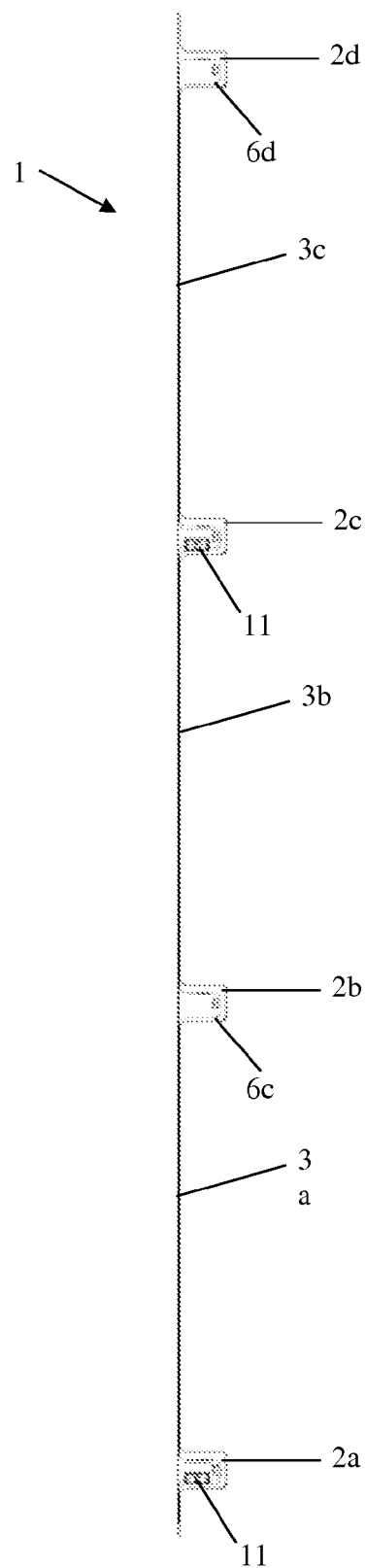
FIG. 1 shows an optical fibre strain sensor array according to an embodiment of the invention.

FIG. 1 shows an optical fibre strain sensor array 1 according to an embodiment of the invention. The array comprises four sensor support panels 2a-2d connected by three connecting members 3a-3c. A 250 micron unsleeved optical fibre 4 runs from a terminal portion 5 of the array to the first sensor support panel 2a, where it forms a first curve (or loop) 6a on the first sensor support panel 2a. The optical fibre 4 continues from the first sensor support panel 2a along the first connecting member 3a to the second sensor support panel 2b, where the optical fibre 4 forms a second curve 6b on the second sensor support panel 2b. Similarly, the optical fibre 4 continues from the second sensor support panel 2b along the second connecting member 3b to the third sensor support panel 2c, where the optical fibre 4 forms a third curve 6c on the third sensor support panel 2c. Finally, the optical fibre 4 continues from the third sensor support panel 2c along the third connecting member 3c to the fourth sensor support panel 2d, where the optical fibre 4 forms a fourth curve 6d on the fourth sensor support panel 2d.

The fourth curve 6d allows the optical fibre to loop back on itself so that the optical fibre 4 continues from the fourth sensor support panel 2d along the third connecting member 3c to the third sensor support panel 2c, where the optical fibre 4 forms a fifth curve 6e on the third sensor support panel 2c. The optical fibre 4 continues from the third sensor support panel 2c along the second connecting member 3b, across the second sensor support panel 2b along the first connecting member 3a to the first sensor support panel 2a, where the optical fibre 4 forms a sixth curve 6f on the first sensor support panel 2a. Finally, the optical fibre 4 extends from the first sensor support panel 2a along the terminal portion 5.

Figure 2:
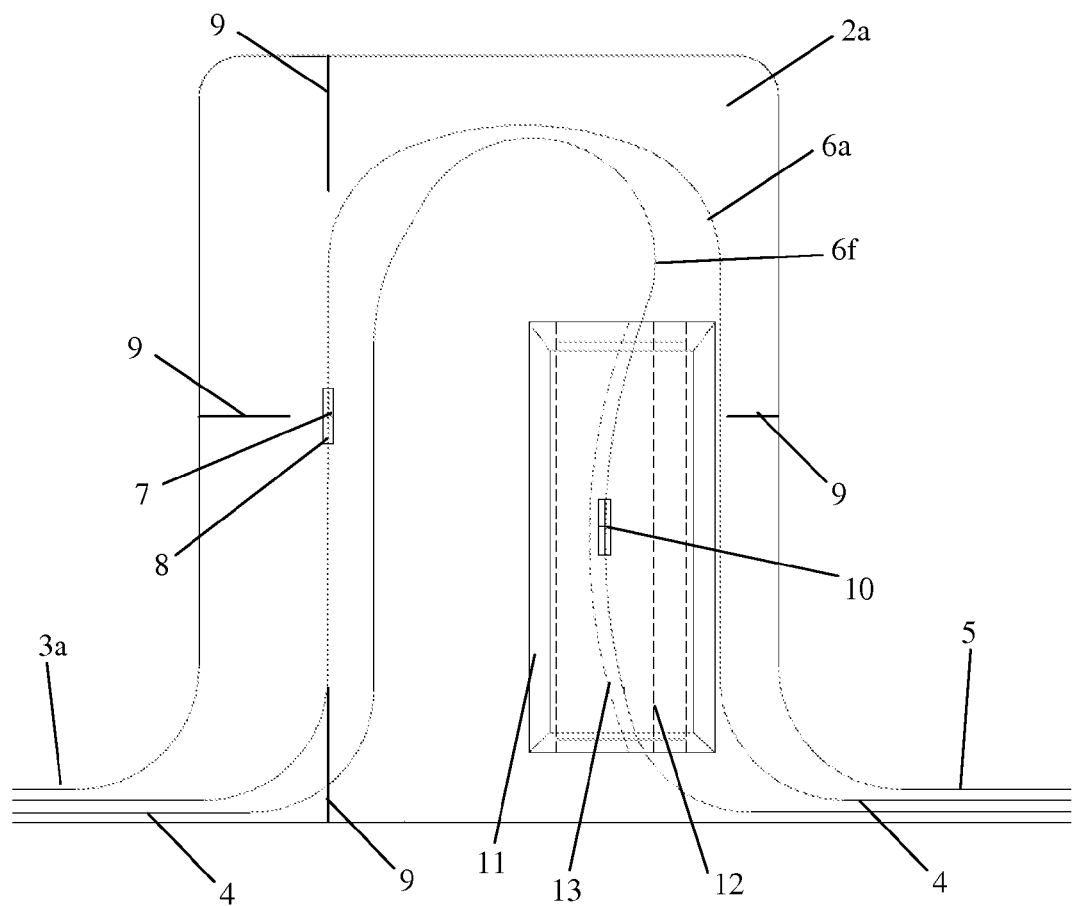
FIG. 2 shows the detail of a sensor support panel of the embodiment of FIG. 1.

FIG. 2 shows the details of the first sensor support panel 2a. The other sensor support panels 2b-2d are configured correspondingly. The first sensor support panel 2a comprises the first curve 6a and the sixth curve 6f of the optical fibre 4. As part of the first curve 6a the optical fibre 4 comprises a strain sensor 7 in the form of a fibre Bragg grating, which is located in a portion of the optical fibre 4 that is arranged in the transverse direction of the array, i.e. perpendicular to the direction of the connecting members 3a-3c. A cross-hair marking 8 is provided on the sensor support panel 2a to mark the location of the grating 7. Additional markings 9 aligned with the axes of the cross-hair 8 are provided on the sensor support panel 2a to assist with the accurate locating of the sensor support panel 2a on the wind turbine blade.

As part of the sixth curve 6f the optical fibre 4 comprises a temperature sensor 10 in the form of a fibre Bragg grating, which is located in a housing 11. The housing 11 defines a conduit for the fibre that has one straight wall 12 and one curved wall 13. In the region of the temperature sensor 10, the optical fibre 4 is arranged between the walls 12, 13 in an arc that follows, but is spaced from the curved wall 13. The housing 11 has a lid which closes the upper surface of the conduit once the optical fibre 4 has been located within the conduit. The portion of the optical fibre 4 within the conduit is free to expand or contract thermally with changes in temperature as it is mechanically isolated from the sensor support panel 2a by the housing 11.

Figure 3:
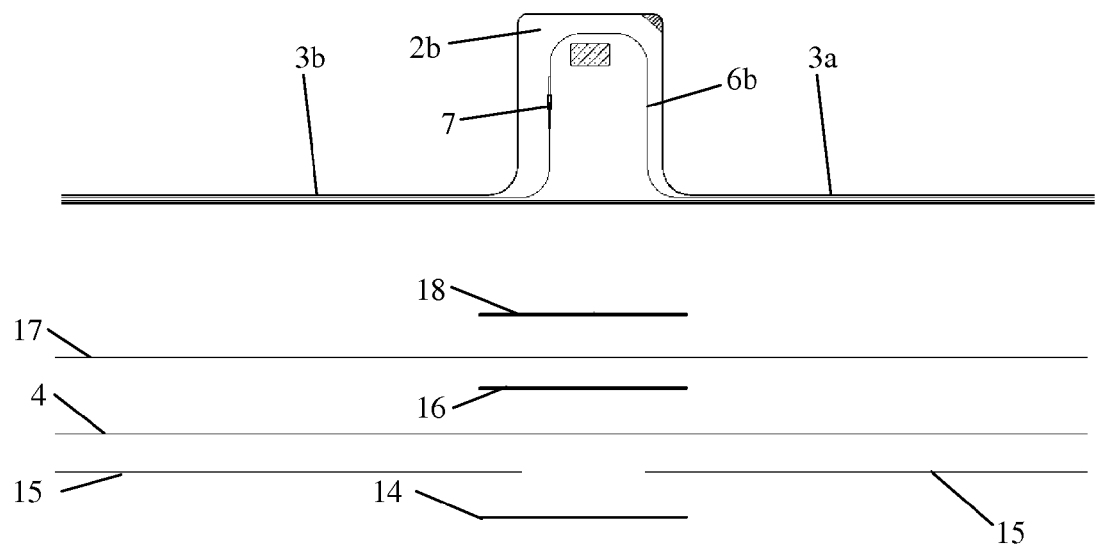
FIG. 3 illustrates the layer structure of the embodiment of FIG. 1.
Figures 4A, 4B:
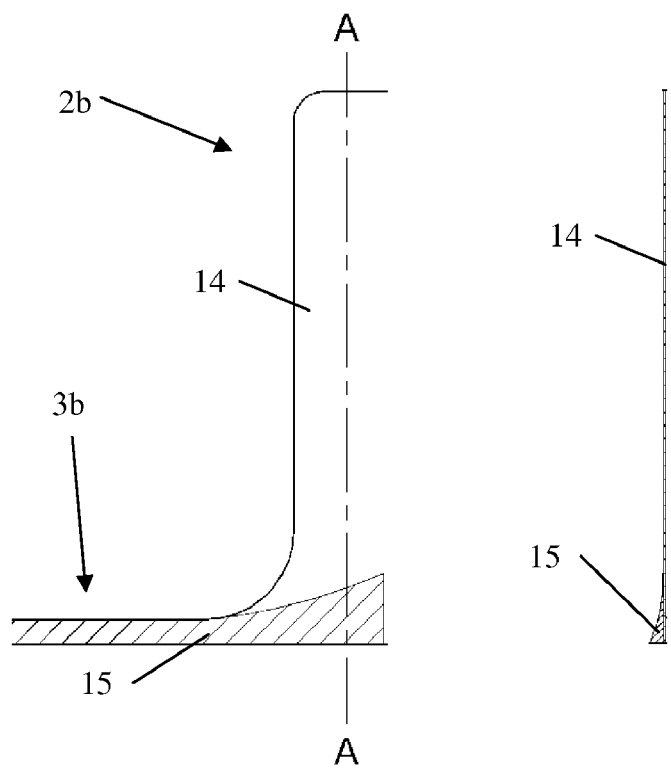

FIG. 3 illustrates the layer structure of the second sensor support panel 2b of the sensor array by showing the second sensor support panel 2b and the corresponding layer structure below. The other sensor support panels 2a, 2c, 2d and the remainder of the connecting members 3a-3c are constructed correspondingly. The base layer 14 of each sensor support panel 2a-2d is a prepreg (glass fibre pre-impregnated with epoxy resin) layer of between 100 g and 500 g backed with a peel ply of between 50 g and 150 g. The peel ply is arranged outermost. Over the base layer 14, first layers 15 of 800 g to 2400 g unidirectional glass fibre cloth are located. The first layers 15 overlap the edges of the base layer 14 and are spaced in the longitudinal direction. The first layers 15 form the base layer of the connecting members. As shown in FIGS. 3a and 3b, the fibres of the ends of the first layers 15 are flared out so that their thickness is reduced in order to form a smooth transition to the thickness of the base layer 14.

With the first layers 15 in position, the housing 11 (without the lid) is located on the base layer 14 for those sensor support panels 2a and 2c that incorporate a temperature sensor. The optical fibre 4 is positioned on the first layers 15 and the base layer 14 (and the housing 11) in the required configuration. The surface of the prepreg material is relatively tacky and can be used to retain the optical fibre 4 in position on the layers 14, 15. With the optical fibre 4 in position, the lid of the housing 11 is fitted and sealed in position with adhesive tape and the ends of the conduit are sealed with quick-setting epoxy resin to hold the optical fibre 4 and the temperature sensor 10 in position. The strain sensor 7 is covered with a small strip of unidirectional glass fibre cloth (not shown) for additional protection. A cover layer 16 of 100 g to 500 g prepreg is applied over the curve of the optical fibre 4 (and the housing 11). Over the cover layer 16, a second layer 17 of 800 g to 2400 g unidirectional glass fibre cloth is located. The second layer 16 is continuous along the entire longitudinal extent of the sensor array 1 and therefore provides mechanical integrity to the structure. A protective layer 18 of 30 g to 90 g peel ply covers the outer surface of the sensor support panel 2a-2d. With the layers assembled, the epoxy resin in the glass fibres and the prepreg is heat cured to form the final structure.

It will be seen from the above that in the region of the sensor support panels 2a-2d, the optical fibre 4 is sandwiched between at least the base layer 14 and the cover layer 16. In the region of the connecting members 3a-3d, the optical fibre 4 is sandwiched between at least the first layer 15 and the second layer 17.

Figure 5:
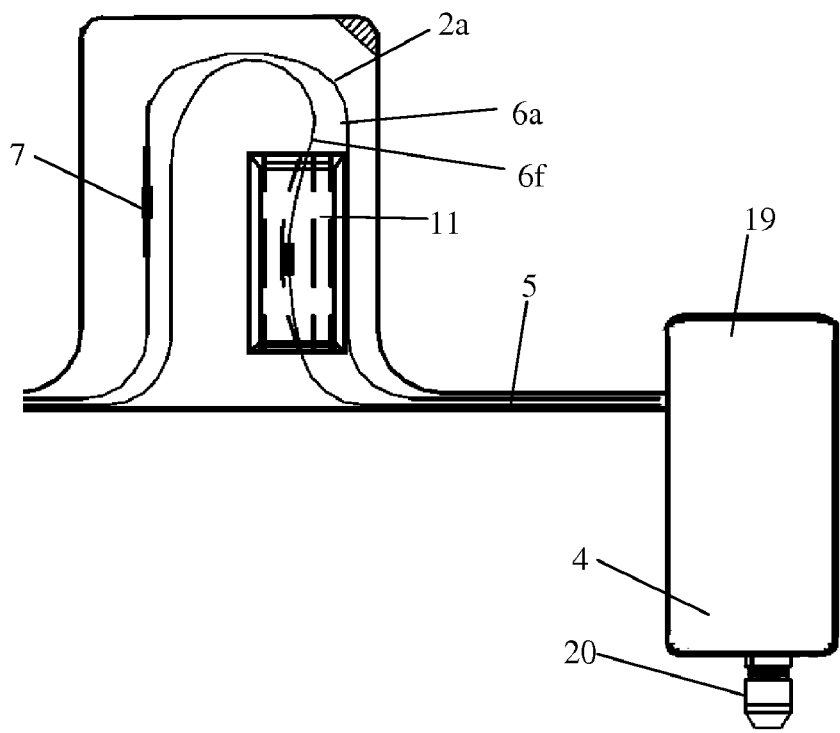
FIG. 5 shows the connector box of the embodiment of FIG. 1.

In the embodiment shown, the spacing between subsequent sensor support panels 2a-2d is approximately 1.8 m. The sensor support panels 2a-2d have a length in the longitudinal direction of 14 cm and a width in the transverse direction of 19 cm. The connecting members 3a-3c have a width in the transverse direction of approximately 4 mm As shown in FIG. 5, the terminal portion 5 of the sensor array 1 extends into a connector box 19. In the region of the terminal portion 5 the fibre is in the form of a 900 micron sleeved fibre for exiting the array. The material of the first and second layers, 15, 17 extends into the connector box 19 where it is clamped and therefore provides a rugged mechanical connection between the connector box 19 and the sensor array 1. Within the connector box 19, the optical fibre 4 is formed into a coil for strain relief and exits the connector box 19 via a cable gland 20. The output optical fibre provides the connection to the instrument that supplies optical pulses to the optical fibre 4 and evaluates the reflected light from the gratings 7, 8 as described in WO 2004/056017, for example.

Figure 6:
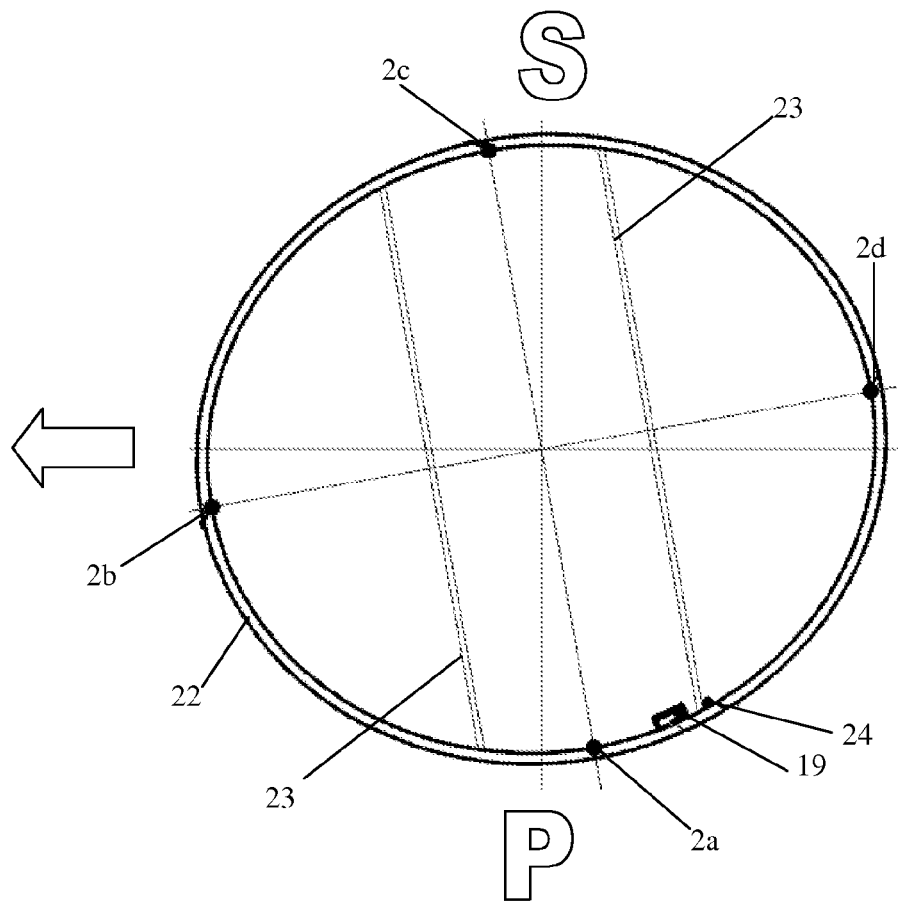
FIG. 6 shows the positioning of the sensor array of FIG. 1 within a wind turbine blade.

FIG. 6 shows the sensor array 1 in position in a typical wind turbine blade 21. The view in FIG. 6 is a cross section of the base of the turbine blade 21 viewed from the hub of the wind turbine towards the tip of the turbine blade 21. The direction of travel of the turbine blade is indicated by the large arrow and suction side of the blade aerofoil is indicated by the large letter S and the pressure side of the blade aerofoil is indicated by the large letter P. The turbine blade 21 is constructed as a surface shell 22 mounted about a structural box beam 23. The sensor array is mounted to the internal surface of the shell 22 to form a circumferential ring. The sensor support panels 2a-2d are aligned in their respective positions and then secured in place with glass fibre cloth and epoxy resin. A silica-rich resin is applied to the connecting members 3a-3c to adhere them to the inner blade surface. Alternatively, the sensor support panels may be embedded in the shell 22.

As shown in FIG. 6, the first sensor support panel 2a and the associated strain sensor 7 and temperature sensor 10 are located on the pressure side of the turbine blade 21. The third sensor support panel 2c and the associated strain sensor 7 and temperature sensor 10 are located on the suction side of the turbine blade 21. Thus, the differential strain measurements from this pair of sensors can be used to determine bending moments on the turbine blade 21 due to forces normal to the plane of rotation of the turbine blade.

The second sensor support panel 2b and the associated strain sensor 7 are located on the leading edge of the turbine blade 21. The fourth sensor support panel 2c and the associated strain sensor 7 are located on the trailing edge of the turbine blade 21. Thus, the differential strain measurements from this pair of sensors can be used to determine bending moments on the turbine blade 21 due to forces in the plane of rotation of the turbine blade.

The sensors are located off the axes of the turbine blade 21 to avoid the sensors 7 being located on the seam of the two blade halves and so that the sensors are aligned with the direction of travel of the blade 21 in typical operating position of the blade, i.e. with 10 to 20 degrees of rotation, for maximum accuracy and minimum crosstalk.

The connector box 19 is mounted to the inner surface of the turbine blade 21. The turbine blade 21 includes a lightning conductor 24 and it will be seen that the sensor array 1 is arranged such that the array 1 does not cross the lightning conductor 24.

Figure 7:
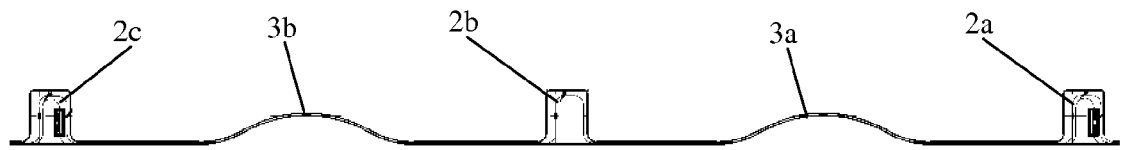
FIG. 7 illustrates the flexing of the connecting members of the array of FIG. 1.

With the sensor array 1 in position, the circumferential spacing between the sensor support panels 2a-2d is less than the nominal 1.8 m. However, the flexibility of the connecting members 3a-3c allows them to flex, as indicated in FIG. 7, in order that the sensor support panels 2a-2d are located in the correct positions. In this way, manufacturing tolerances can be accommodated while maintaining the accuracy of the sensor locations. In addition, the connecting members 3a-3c are able to roll about their longitudinal axes (and onto their side) to provide additional flexibility in the transverse direction.

Although the invention has been described in relation to a sensor array in which all of the sensor support panels extend from the same side of the connecting members, this is not necessary. For example successive sensor support panels may extend from the alternating sides of the connecting members. Furthermore, although the strain sensors in the described embodiment run transversely to the longitudinal direction of the connecting members, it is possible for the strain sensors to be arranged parallel to the longitudinal direction of the connecting members. Furthermore, it is not necessary for the sensor support panels and the connecting members to be arranged at right angles and other angles are possible.

In summary, an optical fibre strain sensor array comprises several sensor support panels spaced in its longitudinal direction and at least one connecting member extending in the longitudinal direction, which mechanically interconnects the sensor support panels. An optical fibre is supported by the sensor support panels and the connecting member. The optical fibre extends with the connecting member between the sensor support panels and forms a curve on the sensor support panel, the curve including at least one portion of the optical fibre that extends in the transverse direction. The width of the connecting member is substantially less than the width of the sensor support panels, such that the connecting member is capable of flexure in the transverse direction. This has the advantage that the connecting member can be flexed to take up any slack during installation of the optical fibre strain sensor array in a wind turbine blade and can be fitted to the turbine blade even if the blade has a conical shape.

The invention claimed is:

1. An optical fibre strain sensor array having a longitudinal direction and a transverse direction, the array comprising: a plurality of sensor support panels spaced in the longitudinal direction and having a width in the transverse direction;
   at least one connecting member extending in the longitudinal direction and having a width in the transverse direction, the connecting member mechanically interconnecting the sensor support panels;
   an optical fibre supported by the sensor support panels and the connecting member, wherein the optical fibre extends with the connecting member between the sensor support panels and forms a curve on the sensor support panel, the curve including at least one portion of the optical fibre that extends in the transverse direction; and the width of the connecting member is substantially less than the width of the sensor support panels, whereby the connecting member is capable of flexure in the transverse direction; and wherein at least one sensor support panel comprises a temperature compensation device in the form of a housing surrounding the optical fibre and fixed to the optical fibre at each end of the housing, wherein the length of the optical fibre within the housing is greater than the distance between the ends of the housing.

2. An optical fibre strain sensor array as claimed in claim 1, wherein the portion of the optical fibre that extends in the transverse direction includes an optical fibre strain sensor.

3. An optical fibre strain sensor array as claimed in claim 1, wherein the width of the sensor support panel is greater than 25 times the width of the connecting member.

4. An optical fibre strain sensor array as claimed in claim 1, wherein the sensor support panel is thinner in the direction normal to both the transverse and longitudinal directions than the connecting member.

5. An optical fibre strain sensor array as claimed in claim 1, wherein at least one of the sensor support panels and/or the connecting member is formed of layers of fibre glass or carbon fibre with the optical fibre sandwiched between the layers.

6. An optical fibre strain sensor array as claimed in claim 1, wherein the housing is formed from a base and a cover, whereby the optical fibre can be located within the housing during manufacture by placing the optical fibre on the base and attaching the cover.

7. An optical fibre strain sensor array as claimed in claim 1, wherein the portion of the optical fibre within the housing comprises an optical fibre strain sensor.

* * * * *